UNITED STATES PATENT OFFICE.

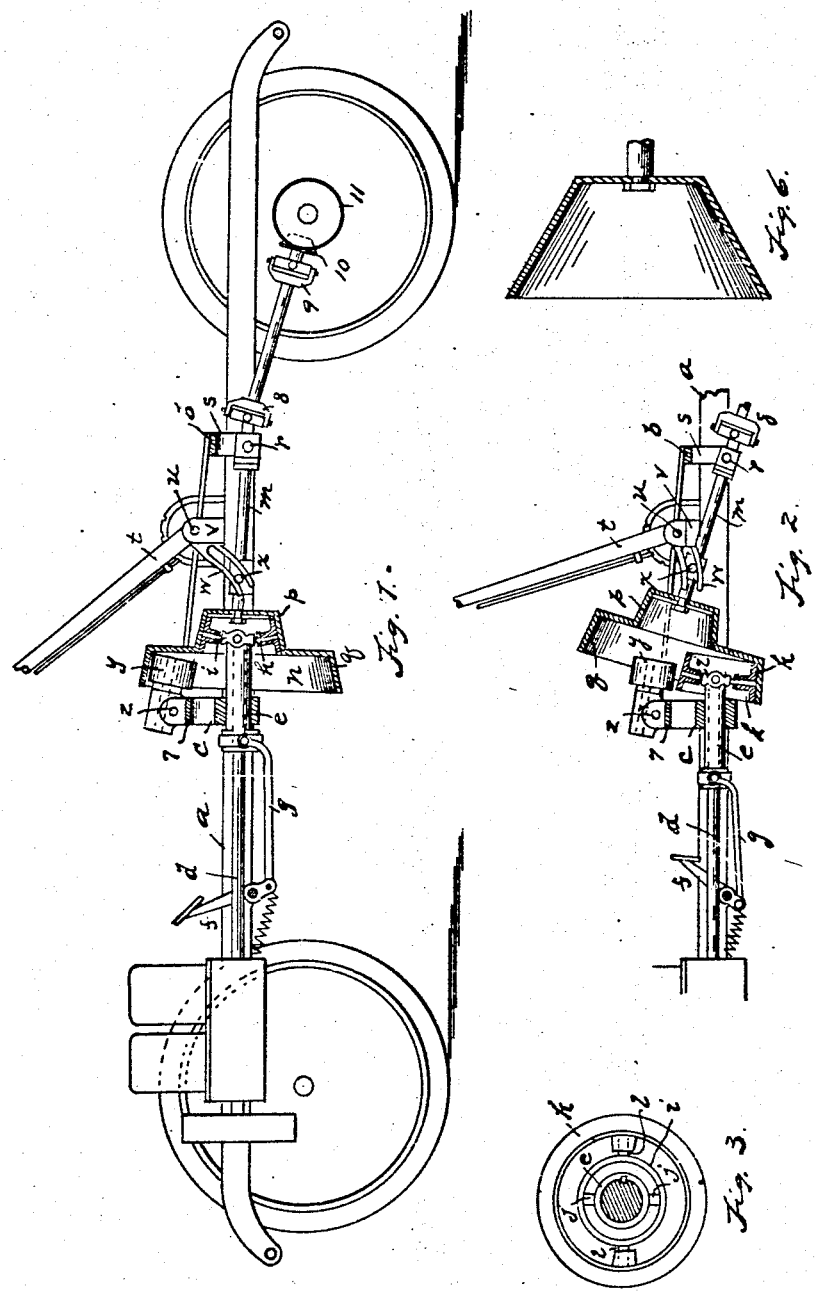

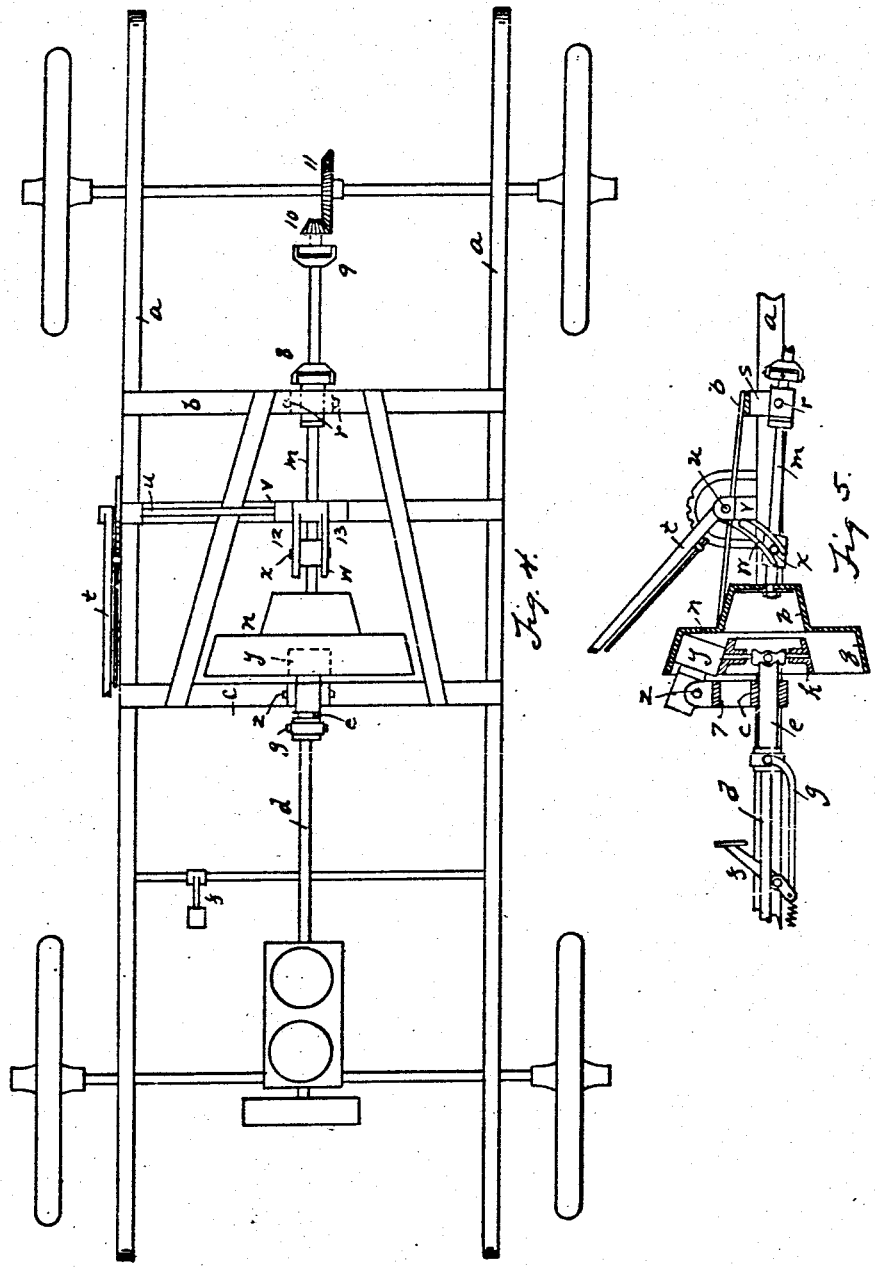

ROBBIE A. REYNOLDS AND WILLIAM E. BEE, OF DETROIT, MICHIGAN.

TRANSMISSION MECHANISM.

No. 831,523.  Specification of Letters Patent.  Patented Sept. 18, 1906.

Application filed March 28, 1906. Serial No. 308,420.

*To all whom it may concern:*

Be it known that we, ROBBIE A. REYNOLDS and WILLIAM E. BEE, citizens of the United States, residing at Detroit, county of Wayne, State of Michigan, have invented a certain new and useful Improvement in Transmission Mechanism, of which the following is a specification, reference being had to the accompanying drawings, which form a part of this specification.

Our invention has for its object certain new and useful improvements in transmission mechanism for automobiles and for analogous purposes; and it consists of the construction, combination, and arrangement of devices and appliances hereinafter specified and claimed, and illustrated in the accompanying drawings, in which—

Figure 1 is a view in side elevation showing parts in vertical section illustrating our invention, the mechanism being in position for securing a direct drive and high speed. Fig. 2 is a similar view of portions of the mechanism illustrated in Fig. 1, but showing the mechanism in position for securing a low speed. Fig. 3 is a view in end elevation of the friction-cone, showing the shaft in cross-section. Fig. 4 is a plan view. Fig. 5 is a view in side elevation showing parts in vertical section, the mechanism being in position to secure a reverse motion. Fig. 6 is a detail view illustrating a modification in the construction of the friction-drum.

Our improved transmission mechanism comprises a driving friction-cone and preferably a stepped friction-drum, the cone having an internal driving engagement with the friction-drum to secure plural speeds ahead, additional mechanism being employed to secure a reverse motion, the relative positions of the friction-cone and friction-drum being changeable to secure different speeds ahead, a reverse motion being secured, as shown, by means of an idler interposed between the friction-cone and friction-drum, the mechanism being adjustable to bring the cone into contact with the idler when a reverse motion is desired, the idler being arranged to have internal frictional contact with the friction-drum.

The aim of our invention is to provide a transmission mechanism of simple, efficient, and economical construction.

We carry out our invention as follows:

In the drawings, $a$ represents the framework of the machine, which may be of any suitable construction, the same being shown herewith provided with cross-bars $b$ and $c$ intermediate their extremities. The driving or engine shaft is indicated at $d$, upon which is engaged a reciprocatory sleeve $e$, the same being movable longitudinally of the driving-shaft by suitable lever mechanism (indicated at $f$) connected with said sleeve, as by a connecting-rod $g$. About the sleeve $e$ is engaged a cylinder or sleeve $i$, supported upon the sleeve $e$ by pins $j$, and about the cylinder or sleeve $i$ is a friction-ring, (indicated at $k$,) supported upon the cylinder $i$ by pins $l$, the friction-ring $k$ being thus adjustable upon the pins $j$ and $l$. A driven shaft is indicated at $m$, upon the inner end of which is secured a driven friction-drum, (indicated at $n$.) We prefer that the friction-drum should be a "stepped" drum, the inner periphery of one step of said drum being indicated at $p$ and that of another step being indicated at $q$, the internal diameters of the steps, of course, being of different diameters.

While we have shown but two steps of the drum, we would have it understood that we do not limit ourselves solely to two in number, as our invention broadly contemplates a friction-drum with multiple steps. The multiple steps of the drum have their internal peripheries each of angular or conical form to be engaged by the correspondingly-shaped driving friction-cone. The driven shaft $m$ is fulcrumed, as at $r$, upon any suitable support or bracket, (indicated at $s$,) which may be secured upon the cross-bar $b$. Engaged with the shaft $m$ is suitable lever mechanism (indicated at $t$) fulcrumed, as at $u$, upon a suitable bracket $v$, supported in any suitable manner upon the frame, the lever mechanism $t$ being provided with a slotted arm $w$, engaging a pin $x$ upon the shaft $m$. This construction and arrangement, it will be observed, enables the driven friction-drum $n$ to be oscillated—that is, raised and lowered—its raised position being illustrated, for example, in Fig. 2. Any suitable mechanism may be provided to lock the lever mechanism $t$ in given position.

When a direct and high speed is desired, the drum $n$ is adjusted into proper position and the cone $h$ is advanced into the narrower end of the drum, so as to have frictional contact with the interior of the step $p$ of said drum, the degree of frictional contact desired being secured by means of the lever mechanisms $f$ or $t$. When it is desired to have a slow speed ahead, the sleeve $c$, carrying the cone $k$, is withdrawn upon the shaft $d$ a suitable distance to permit the drum $n$ being elevated so as to bring the cone into frictional contact with the interior surface of the step $q$ of the drum. To secure a reverse motion, we provide an idler $y$, which may be supported in any suitable manner, as upon an arm fulcrumed, as at $z$, upon a bracket (indicated by the numeral 7) suitably supported upon the frame. This idler is arranged so that the drum $n$ may be brought into contact therewith when a reverse motion is desired, the cone $k$ being also in contact with the idler. The driven shaft $m$ has preferably universal joints 8 and 9 located therein, said shaft being provided with a beveled gear 10, meshing with a gear 11 upon the axle.

As we have hereinbefore intimated, the driven friction-drum might within the scope of our invention be simply a cone-shaped drum, (as we do not limit ourselves to a stepped drum,) as shown in Fig. 6.

It will readily be seen that the driving is always internal and that there will be no slipping of surfaces, for the reason that the contact-surfaces are at the same angle. The construction of the driving-cone is such that it may adjust itself to the angle of the driven drum.

It will readily be seen that at high speed, or upon the direct drive, all side thrust is eliminated. On the slow speed or drive to prevent side thrust we provide side bearings (indicated at 12 and 13) located on opposite sides of the arm $w$, which take the side thrust. It will also be apparent that the idler will drive at the same angle as the driving-cone. The adjustment of the driven drum requires but a small amount of leverage. The fulcrum $r$ may be provided with a ball-bearing of ordinary construction.

It is obvious that the driven shaft is radially oscillatory—that is to say, the inner end of the driven shaft from the joint 8 is the radius of which the joint is the center, the inner end of the driven shaft being oscillatory about the joint as a center. In other words, the driven shaft is the radius of the arc on which the stepped or conically-shaped drum oscillates.

What we claim as our invention is—

1. In a transmission mechanism the combination of a driving-shaft, a friction-cone movable upon said shaft longitudinally thereof, a driven shaft oscillatory at its inner end, and a drum carried by the oscillatory inner end of the driven shaft engageable by the friction-cone, the driven shaft being the radius of the arc in which the drum oscillates.

2. In a transmission mechanism the combination of a driving-shaft, a friction-cone movable upon said shaft longitudinally thereof, a driven shaft oscillatory at its inner end, a friction-drum carried by the oscillatory inner end of the driven shaft engageable by the friction-cone, the interior surface of the friction-drum being of conical form, the driven shaft being the radius of the arc in which the drum oscillates.

3. In a transmission mechanism the combination of a driving-shaft, an oscillatory driven shaft, a friction-cone movable upon the driving-shaft longitudinally thereof, and a conically-stepped friction-drum carried by the driven shaft engageable by the friction-cone, the driven shaft being the radius of the arc in which the drum oscillates.

4. In a transmission mechanism the combination of a driving-shaft, a friction-cone carried thereupon, means to move the friction-cone longitudinally of the shaft, a driven shaft oscillatory at its inner end, and a conical friction-drum carried by the driven shaft engageable at different diameters thereof by the friction-cone.

5. In a transmission mechanism the combination of a driving-shaft, a sleeve provided with a friction-cone movable upon said shaft longitudinally thereof, a jointed driven shaft oscillatory at its inner end from the jointed portion thereof, and a friction-drum carried by the driven shaft engageable at different diameters by the friction-cone.

6. In a transmission mechanism the combination of a driving-shaft, a friction-cone movable upon the shaft longitudinally thereof, a driven shaft oscillatory at its inner end, a stepped friction-drum carried by the oscillatory inner end of the driven shaft having its inner surfaces of conical form engageable at different diameters by the friction-cone, and an idler arranged to be actively interposed between the friction-cone and the friction-drum, and to be removed from active position, the driven shaft being the radius of the arc in which the drum oscillates.

7. In a transmission mechanism the combination of a driving-shaft, a friction-cone movable back and forth upon said shaft and rotatable therewith, a driven shaft oscillatory at its inner end and a friction-drum carried by the oscillatory inner end of the driven shaft engageable by the friction-cone to secure multiple speeds ahead, the driven shaft being the radius of the arc in which the drum oscillates.

8. In a transmission mechanism the combination of a driving-shaft, a friction-cone rotatable with said shaft and movable back and forth thereupon, a driven shaft oscillatory at the inner end thereof, a friction-drum carried upon the inner end of the driven shaft engageable by the friction-cone, a lever to oscillate the inner end of the driven shaft, said lever provided with a slotted arm engaging the driven shaft.

9. In a transmission mechanism the combination of a driving-shaft, a friction-cone movable back and forth upon said shaft and rotatable therewith, a driven shaft oscillatory at its inner end, and a friction-drum carried by the oscillatory inner end of the driven shaft engageable at different points by the friction-cone to secure multiple speeds ahead, said driven shaft provided with a universal joint interposed therein and made oscillatory at its inner end from said joint as a center of oscillation.

10. In a transmission mechanism the combination of a driving-shaft, a sleeve rotatable with the driving-shaft and movable back and forth thereupon, a friction-cone carried by said sleeve and adjustable at different angles thereupon, a driven shaft oscillatory at its inner end, and a friction-drum carried by the oscillatory inner end of the driven shaft engageable by the friction-cone to secure multiple speeds ahead, the driven shaft being the radius of the arc in which the drum oscillates.

11. In a transmission mechanism the combination of a driving-shaft, a friction-cone movable upon the shaft longitudinally thereof, a driven shaft oscillatory at its inner end, a friction-drum carried by the oscillatory inner end of the driven shaft engageable at different diameters by the friction-cone, and an oscillatory idler arranged to be actively interposed between the friction-cone and the friction-drum, the driven shaft being the radius of the arc in which the drum oscillates.

12. In a transmission mechanism the combination of a driving-shaft, a sleeve rotatable with the driving-shaft and movable back and forth thereupon, a friction-cone carried by said sleeve, a lever to actuate the sleeve, a jointed driven shaft made oscillatory at the inner extremity thereof about the joint as a center, a friction-drum carried by the inner end of the driven shaft engageable by the friction-cone at different diameters, and a lever to actuate the oscillatory end of the driven shaft.

13. In a transmission mechanism the combination of a driving-shaft, a friction-cone rotatable with the driving-shaft and movable back and forth thereupon, a driven shaft oscillatory at its inner end, and a friction-drum carried by the oscillatory inner end of the driven shaft engageable on its inner surface by the friction-cone at different diameters thereof, the driven shaft being the radius of the arc in which the drum oscillates.

14. In a transmission mechanism the combination of a driving-shaft, a sleeve rotatable with the driving-shaft and movable back and forth thereupon, a friction-cone carried by said sleeve, a jointed driven shaft fulcrumed to oscillate at the inner end thereof, from the joint as a center of oscillation, a friction-drum carried by the inner end of the driven shaft engageable on its inner surface at different diameters by the friction-cone, a lever to actuate the oscillatory end of the driven shaft, and means to lock said lever.

15. In a transmission mechanism the combination of a driving-shaft, a friction-cone rotatable with the driving-shaft and movable back and forth thereupon, a driven shaft oscillatory at its inner end, a friction-drum carried by the oscillatory inner end of the driven shaft engageable by the friction-cone to secure high and low speeds ahead, and means to prevent side thrust on a slow-speed drive.

16. In a transmission mechanism the combination of a driving-shaft, a friction-cone upon said shaft, a jointed driven shaft oscillatory at its inner end from the joint as a center of oscillation, and a friction-drum carried by the oscillatory inner end of the driven shaft engageable by the friction-cone, said cone and drum the one being movable back and forth upon its shaft, whereby the cone will engage the drum at different diameters thereof.

17. In a transmission mechanism the combination of a driving-shaft, a friction-cone upon the driving-shaft, a driven shaft oscillatory at its inner end, and a friction-drum carried by the driven shaft engageable at different diameters thereof by the friction-cone, said cone and said drum the one movable toward the other, the driven shaft being the radius of the arc in which the drum oscillates.

18. In a transmission mechanism the combination of a driving-shaft, a friction-cone rotatable with said shaft and movable back and forth thereupon, a jointed driven shaft, and a friction-drum carried upon the inner end of the driven shaft engageable by the friction-cone, the driven shaft being the radius of the arc in which the drum oscillates.

In testimony whereof we have signed this specification in the presence of two subscribing witnesses.

ROBBIE A. REYNOLDS.
WILLIAM E. BEE.

Witnesses:
  N. S. WRIGHT,
  E. M. SPIELBURG.